United States Patent [19]

Cherry et al.

[11] Patent Number: 5,160,927
[45] Date of Patent: Nov. 3, 1992

[54] SYSTEM AND METHOD FOR DETECTING THE PRESENCE OF OBJECTS IN THE PATH OF MOVABLE VEHICLE

[75] Inventors: James R. Cherry, Windham, N.H.; David P. Stevens, Billerica; Abel Raynus, Brookline, both of Mass.

[73] Assignee: Armatron International, Inc., Melrose, Mass.

[21] Appl. No.: 758,244

[22] Filed: Sep. 10, 1991

Related U.S. Application Data

[63] Continuation of Ser. No. 514,389, Apr. 25, 1990, abandoned.

[51] Int. Cl.$^5$ ............................................. G08G 1/16
[52] U.S. Cl. ................................... 340/904; 367/909
[58] Field of Search ............... 340/903, 904, 435, 942, 340/943; 367/909

[56] References Cited

U.S. PATENT DOCUMENTS

| | | | |
|---|---|---|---|
| 4,240,152 | 12/1980 | Duncan et al. | 367/909 X |
| 4,260,980 | 4/1981 | Bates | 340/904 |
| 4,528,563 | 7/1985 | Takeuchi | 340/903 |
| 4,551,722 | 11/1990 | Tsuda et al. | 340/904 |
| 4,561,064 | 12/1985 | Bruggen et al. | 340/904 X |
| 4,766,421 | 8/1988 | Beggs et al. | 340/904 |
| 4,910,512 | 3/1990 | Riedel | 367/909 |

FOREIGN PATENT DOCUMENTS

| | | | |
|---|---|---|---|
| 3341022 | 5/1985 | Fed. Rep. of Germany | 340/904 |
| 2215158 | 9/1989 | United Kingdom | 340/903 |

*Primary Examiner*—Jin F. Ng
*Assistant Examiner*—Brian R. Tumm
*Attorney, Agent, or Firm*—Samuels, Gauthier & Stevens

[57] ABSTRACT

A system and method for detecting the presence of objects in the path of the end portion of a movable vehicle are disclosed. A vehicle mounted transmitter transmits bursts of ultrasonic object detection signals. A receiver also mounted on the vehicle receives not only a direct signal from the transmitter, but also signals reflected from objects in the path of the movable vehicle. The transmitter and receiver are mounted on the end portion of the vehicle so that they constitute the foci of an elliptical path defining the loci of all points of signal reflection having the same total transit time of signal from the transmitter to a reflecting object and back to the receiver. The elliptical path of the loci of the closest detectable objects preferably encompasses substantially the entire end portion of the movable vehicle. An object warning device is actuated in response to the receipt of a reflected object detection signal that has a predetermined total transit time of signal from the transmitter to the reflecting object and back to the receiver.

16 Claims, 2 Drawing Sheets

SYSTEM AND METHOD FOR DETECTING THE PRESENCE OF OBJECTS IN THE PATH OF MOVABLE VEHICLE

BACKGROUND OF THE INVENTION

This application is a continuation of Ser. No. 514,389 filed Apr. 25, 1990, now abandoned.

The present invention relates to object detection systems in general and, more particularly, to an object detection system and method for detecting the presence of objects in the path of a movable vehicle.

Various systems have been proposed in the prior art to warn drivers of the presence of an object in the path of a movable vehicle. Typically, such warning systems provide a suitable warning signal, either audible or visual or both, upon detecting the presence of an object in the path of a moving vehicle. System actuation occurs when the driver engages reverse gear to back up the vehicle. Representative examples of such systems can be found in U.S. Pat. Nos. 3,360,775 (transmitter and transducer receivers located in pairs at the corners of a vehicle); 4,278,962 (rotating transmitter and rotating receiver); 4,667,195 (corner located transmitter with adjacent receiver); 4,623,032 (transmitter located at each corner with a centrally located receiver); 4,551,722 (closely spaced transmit/receive transducers with a fixed reflector for calibration purposes); and 4,490,716 (an array of transmitters).

The prior art that is represented by the patents listed above does not provide an inexpensive, relatively simple and accurate system for producing a warning signal of the presence of an object in the path of a movable vehicle.

It is accordingly a general object of the present invention to provide an improved object detection system for movable vehicles.

It is a specific object of the invention to provide an object detection system for movable vehicles that utilizes a single stationary transmitter and a single stationary receiver.

It is a further object of the invention to provide an object detection system for movable vehicles utilizing a single transmitter and single receiver that are relatively widely spaced apart with respect to the width of the vehicle.

It is a still further object of the invention to provide an object detection system for movable vehicles utilizing a single transmitter and receiver with the transmitter and receivers spaced apart by a distance such that the transmitter and receiver are the foci of an elliptical path that constitutes the loci of all points of signal reflection having the same total transit time of signal from the transmitter to the reflecting object and back to the receiver.

It is still another object of the invention to provide an object detection system for movable vehicles in which the elliptical path of the loci of the closest detectable objects encompasses substantially the entire end portion of the movable vehicle.

It is a feature of the invention that the system can be assembled from relatively inexpensive, readily available electronic components.

It is another feature of the invention that the system can be mounted on a variety of different types of vehicles without requiring significant alteration of the structure of the vehicle.

BRIEF DESCRIPTION OF THE INVENTION

The object detection system utilizes a transmitter that produces object detection signals in the form of bursts of ultrasonic, infrared, or the like radiation, and a receiver which receives both a direct object detection signal from the transmitter as well as an indirect signal reflected from an object in the path of the movable vehicle. The transmitter and receiver are mounted on the vehicle preferably so that the transmitter and receiver are spaced apart by a minimum distance of $S = W - (V_s t_d)$, where $W$ = the width of the vehicle, $V_s$ = the transmission speed of the transmitted radiation, e.g. the speed of sound in the case of ultrasonic signals, and $t_d$ is the duration of the bursts of transmitted signals. A suitable warning device, either audible, visual or both, provides a warning in response to the receipt of an indirect signal reflected from an object in the path of the movable vehicle. To produce such a warning, the received indirect reflected signal must have a predetermined total transit time of signal from the transmitter to the reflecting object and back to the receiver. The minimum detection distance is a function of the transit time of the direct signal from the transmitter to the receiver and the duration of the burst of object detection signals.

DETAILED DESCRIPTION OF THE INVENTION

Figure 1:
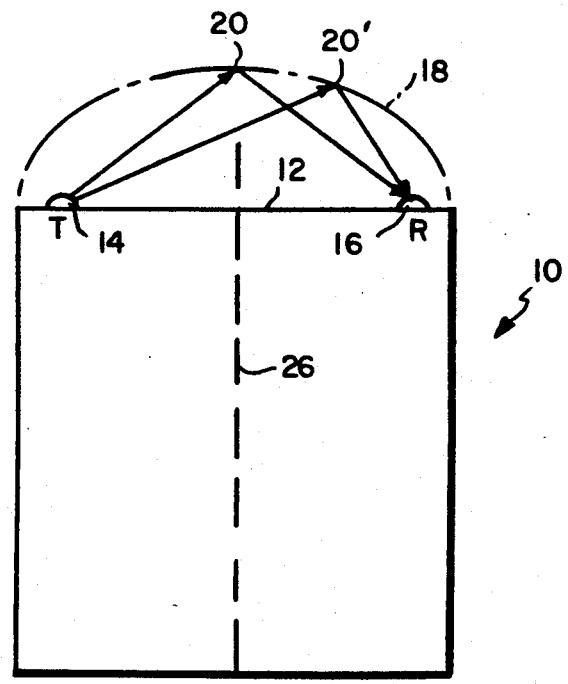
FIG. 1 is a diagrammatic view of a vehicle shown in plan view, illustrating the position of the transmitter and receiver of the object detection system and the loci of equal total transit time of signals from the transmitter to the receiver.

Turning now to the drawings, FIG. 1 illustrates diagrammatically a movable vehicle indicated generally by the reference numeral 10, having an end portion 12, upon which are mounted a transmitter 14 and receiver 16. The transmitter 14 transmits object detection signals, preferably bursts of ultrasonic waves that reflect from an object in the path of the movable vehicle and are received by receiver 16. The receiver 16 also directly receives signals transmitted by transmitter 14. Elliptical path 18 constitutes the loci of all points having a constant total signal transit time from the transmitter 14 to a reflecting object 20 or 20' and back to the receiver 16.

Figure 2:
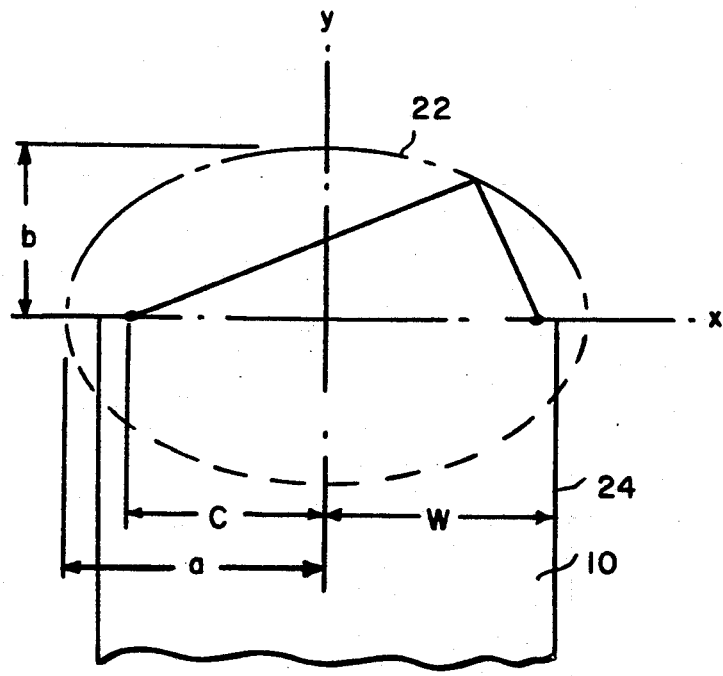
FIG. 2 is a diagram illustrating the geometry of the placement of the transmitter and receiver on the end portion of a vehicle; and, FIG. 3 is a functional block diagram of the object detection system.

Referring now to FIG. 2, there is shown a diagram illustrating the geometry of the object detection system and the preferred locations for the transmitter and receiver 14 and 16. The object detection or ranging system measures a constant range to targets whose loci define an ellipse with the transmitter as one foci, the receiver as the other foci, and the major axis of the ellipse contained in a plane transverse to the longitudinal or "y" in FIG. 2 of the movable vehicle. The ellipse 22 is typical of a family of ellipses with common foci, which define the constant range locations of the object detection system.

The general equation for this ellipse is $$\frac{x^2}{a^2} + \frac{y^2}{b^2} = 1 \quad (1)$$

from which it can be shown that:

$$a^2 = b^2 + c^2 \quad (2)$$

Using equations 1 and 2:

$$y = \frac{b\sqrt{b^2 + c^2 - x^2}}{\sqrt{b^2 + c^2}} \quad (3)$$

In FIG. 2, W represents the distance from the minor axis of the range ellipse 22 to the side edge 24 of the vehicle 10.

Thus, for X=W:

$$y_W = \frac{b\sqrt{b^2 + c^2 - W^2}}{\sqrt{b^2 + c^2}} \quad (4)$$

As previously mentioned, the transmitter 14 preferably transmits a burst of ultrasonic waves such as a burst of 40 KHz sine waves. Let the duration of the burst be called $t_d$. The signals transmitted by transmitter 14 are received by direct transmission by the receiver 16. The received direct signal is used to verify complete system operation, as will be described in connection with FIG. 3.

It should be understood in this analysis that no reflected or echo signal used for object detection, i.e. ranging, can be used for warning purposes until the directly received signal has been processed by the object detection system. Thus, the minimum time, $t_m$, to the echo from the first detectable object in the path of the movable vehicle, is equal to the direct signal transit time from transmitter 14 to receiver 16 plus the duration $t_d$ of the burst of ultrasonic object detection signals.

Therefore, $t_m = \frac{2C}{V_s} + t_d \quad (5)$ where $V_s$ = the speed of sound = 344 meters per second. Let $b_m$ be the value of $b$ corresponding to an object or target on the minor axis of the ellipse 22 whose echo or reflected signal is received $t_m$ seconds after transmission, then $$2\sqrt{b_m^2 + c^2} = V_s t_m \quad (6)$$

From FIGS. 5 and 6 we have:

$$2\sqrt{b_m^2 + c^2} = 2C + V_s t_d \quad (7)$$

$$b_m = \frac{[(2C + V_s t_d)^2 - 4C^2]^{\frac{1}{2}}}{2}$$

$$b_m = \frac{[4CV_s t_d + V_s^2 t_d^2]^{\frac{1}{2}}}{2}$$

From FIGS. 5 and 7:

$$y_W = \quad (8)$$

-continued $$\frac{\left[\frac{4CV_s t_d + V_s^2 t_d^2}{2}\right]^{\frac{1}{2}} \left[\frac{4CV_s t_d + V_s^2 t_d^2}{4} + C^2 - W^2\right]^{\frac{1}{2}}}{\left[\frac{4CV_s t_d + V_s^2 t_d^2}{4} + C^2\right]^{\frac{1}{2}}}$$

If a minimum criterion is established with respect to the placement of the transmitter 14 and receiver 16, that an object or target on the ellipse containing $b_m$ would not hit the movable vehicle at its nearest point, then the condition $y_w \geq 0$ must be fulfilled.

Thus, the limit from Equation 8 is:

$$CV_s t_d + \frac{V_s^2 t_d^2}{4} + C^2 - W^2 = 0 \quad (9)$$

$$C = \frac{-V_s t_d + \sqrt{V_s^2 t_d^2 - 4\frac{V + 2_s t_d^2}{4} - W^2}}{2} = 0$$

$$C = \frac{V_s t_d + 2w}{2}$$

$$C = w - \frac{V_s t_d}{2}$$

Finally, from Equation 9, it can be seen that, in order to provide an alarm without impact to an object at the closest possible distance, the minimum spacing distance between the transmitter and receiver is $W - V_s t_d$, where W = the width of the vehicle, $V_s$ = the speed of sound, and $t_d$ is the duration of a burst of ultrasonic object detection signals.

It will be appreciated from the preceding description of the geometry of the placement of transmitter 14 and receiver 16 on the end portion 12 of vehicle 10 that the resulting loci formed ellipse encompasses the entire width of the vehicle to provide a maximum warning area with minimum "dead" spots of object detection. However, it should be understood that the spacing between the transmitter and receiver 14 and 16 respectively, can be reduced below the preferred minimum separation distance, albeit with a diminution in the effectiveness of the object detection system. For example, a car with a width of 1.7 meters and transmitter/receiver spacing as set forth above, if the transmitter and receiver are each moved in by 0.10 meters, then the minimum object detection range increases by 0.16 meters. Furthermore, it should also be understood that the placement of the transmitter and receiver can be either symmetrical with respect to the longitudinal axis 26 of the movable vehicle 10 or asymmetrical in order to achieve different configurations for the object detection area in the path of the movable vehicle.

Figure 3:
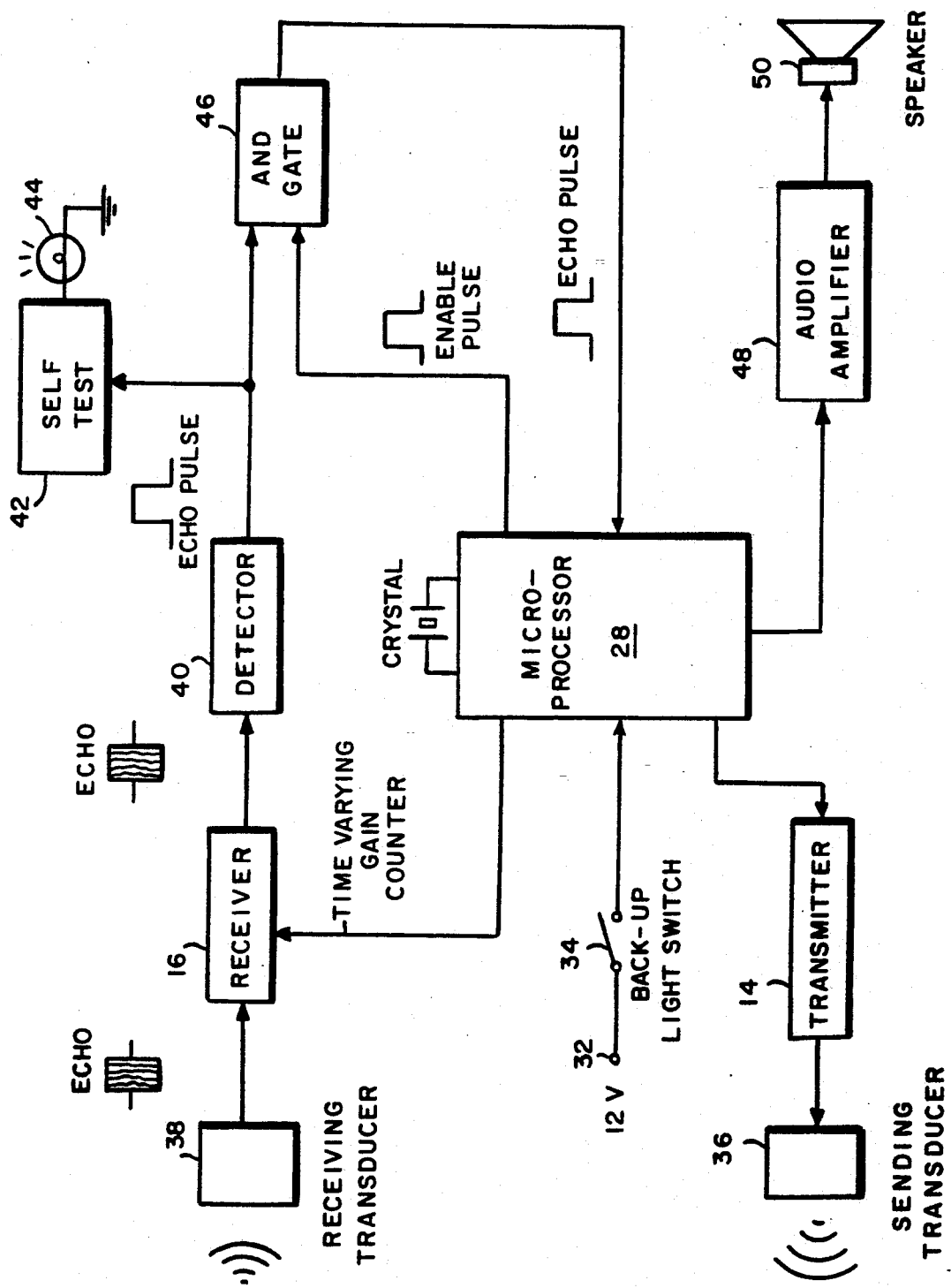

Referring now to FIG. 3, there is shown a functional block diagram of the object detection system of the present invention. A central microprocessor 28, having a crystal controlled clock circuit indicated diagrammatically by crystal 30, controls the operation of transmitter 14 and receiver 16. Actuation of the functions of microprocessor 28 is initiated by applying vehicle voltage from bus 32 through the vehicle's back-up light switch 34. The microprocessor 28 causes transmitter 14 to emit bursts of ultrasonic object detection signal waves through a sending transducer 36. The transmitted signals are received directly by receiver 16 through a receiving transducer 38. The directly received signals, as well as any subsequently received reflected signals from an object, are detected by detector 40, the output of which is applied to a self-test circuit 42. The self test circuit provides an indication, such as a visual indication by light 44, of the receipt of the direct signal, thus indicating that the object detection system is functioning properly.

The output from detector 40 is also applied to one input of an AND gate 46. The AND gate 46 also receives an enabling input pulse from microprocessor 28. The coincidence of the output signal from detector 40 and the enable pulse from microprocessor 28 produces an output from AND gate 46 that represents an echo pulse. The "echo" pulse is applied as an input to microprocessor 28, which in response thereto generates a warning signal that is amplified by amplifier 48 to drive speaker 50.

The circuits shown in block form in FIG. 3 can be implemented with conventional, readily available components. The transmitter and receiver portions can be constructed from the ultrasonic or infrared transmitter/receivers used in current auto-focus cameras.

Having described in detail a preferred embodiment of our invention, it will now be apparent to those skilled in the art that numerous modifications can be made therein without departing from the scope of the invention as defined in the following claims:

What we claim is:

1. A system for detecting the presence of objects in the proximity of a movable vehicle, said system comprising:
   A. transmitter means for transmitting bursts of an object detection signal,
   B. receiver means for receiving said object detection signal both as a direct signal from said transmitter means and as an indirect signal reflected from an object in the proximity of the movable vehicle,
   C. said transmitter means and said receiver means being positioned on said movable vehicle so that points of signal reflection having different total trasit times of the signal from said transmitter means to the reflecting object and back to the receiver means lie on a family of elliptical paths having as their foci, said transmitter means and said receiver means, said family of elliptical paths including one elliptical path which is closest to said transmitter means and said receiver means and which is defined by the loci of the objects closest to said vehicle end portion which said system is capable of detecting,
   D. verification means responsive to the reception of said direct signal from said transmitter means at said receiver means for providing a first signal indicative of the operability of said system; and
   E. warning means responsive to the reception of said indirect signal reflected from said object having a predetermined total transmit time from said transmitter means to the reflecting object and back to the receiver means for providing a second signal indicative of the detection of the object proximate to said vehicle.

2. The system of claim 1 wherein the transmitter means and the receiver means are positioned on the front end of the movable vehicle.

3. The system of claim 1 wherein said bursts of the object detection signals are bursts of ultrasonic waves.

4. The system of claim 1 wherein said bursts of the object detection signals are bursts of infrared waves.

5. The system of claim 1, wherein said predetermined total transit time of the indirect signal is determined as a function of said duration of one of the bursts of said object detection signals and said transmit time of said direct signal transmitted from said transmitter means to said receiver means.

6. The system of claim 1, wherein said predetermined total transit time of the indirect signal is equal to or greater than the sum of duration of one of the bursts of said object detection signals and the transit time of said direct signal transmitted from said transmitter means to said receiver means.

7. The system of claim 1 wherein the transmitter means and the receiver means are positioned on the rear end of the movable vehicle.

8. A system for detecting the presence of objects in the proximity of a movable vehicle, said system comprising:
   A. transmitter means for transmitting bursts of an object detection signal,
   B. receiver means for receiving said object detection signal both as a direct signal from said transmitter means and as an indirect signal reflected from an object in the proximity of the movable vehicle,
   C. verification means responsive to the reception of said direct signal from said transmitter means at said receiver means for providing a first signal indicative of the operability of said system; and
   D. warning means responsive to the reception of said indirect signal reflected from said object having a predetermined total transit time from said transmitter means to the reflecting object and back to the receiver means for providing a second signal indicative of the detection of the object proximate to said vehicle.

9. The system of claim 8, wherein said predetermined total transit time of the indirect signal is determined as a function of said duration of one of the bursts of said object detection signals and said transit time of said direct signal transmitted from said transmitter means to said receiver means.

10. The system of claim 8, wherein said predetermined total transit time of the indirect signal is equal to or greater than the sum of duration of one of the bursts of said object detection signals and the transit time of said direct signal transmitted from said transmitter means to said receiver means.

11. The system of claim 8, wherein said bursts of the object detection signals are bursts of ultrasonic waves.

12. The system of claim 8, wherein said bursts of the object detection signals are bursts of infrared waves.

13. The system of claim 8, wherein said transmitter means and said receiver means are positioned on the rear end of the movable vehicle.

14. The system of claim 8, wherein said transmitter means and said receiver means are positioned on the front end of the movable vehicle.

15. A method for detecting the presence of objects in the proximity of a movable vehicle, said method comprising the steps of:
   A. positioning a transmitter and a receiver on the movable vehicle such that said transmitter and said receiver are positioned at the foci of a family of elliptical paths defined by points of signal reflection having different total transit times of an object detection signal transmitted from said transmitter to a reflecting object in the proximity of the movable vehicle and back to the receiver, said family of elliptical paths including one elliptical path which is closest to said transmitter and said receiver and which is defined by the loci of the objects closest to said vehicle which said system is capable of detecting;

B. transmitting said object detection signal from the transmitter;

C. receiving the transmitted signal at the receiver as both a direct signal and as an indirect signal reflected from said reflecting object;

D. providing a first signal indicative of the operability of the transmitter and receiver in response to the reception of said direct signal from said transmitter at said receiver; and E. providing a second signal indicative of the detection of an object in the proximity of said vehicle in response to the reception of said indirect signal reflected from said object having a predetermined total transit time from said transmitter to the reflecting object and back to said receiver.

16. A method for detecting the presence of objects in the proximity of a movable vehicle, said method comprising the steps of:

A. positioning a transmitter and a receiver on the movable vehicle,

B. transmitting bursts of an object detection signal from said transmitter,

C. receiving said object detection signal at said receiver both as a direct signal from said transmitter and as an indirect signal reflected from an object in the proximity of the movable vehicle, D. providing a first signal indicative of the operability of said transmitter and receiver in response to the reception of said direct signal from said transmitter at said receiver; and E. providing a second signal indicative of the detection of the object proximate to said vehicle in response to the reception of said indirect signal reflected from said object having a predetermined total transit time from said transmitter to the reflecting object and back to the receiver.

* * * * *